June 4, 1968     M. VANZO     3,386,131
APPARATUS FOR THE CONTINUOUS TREATMENT OF RUBBER
AND PLASTIC MATERIAL IN GENERAL
Filed June 17, 1966     2 Sheets-Sheet 1
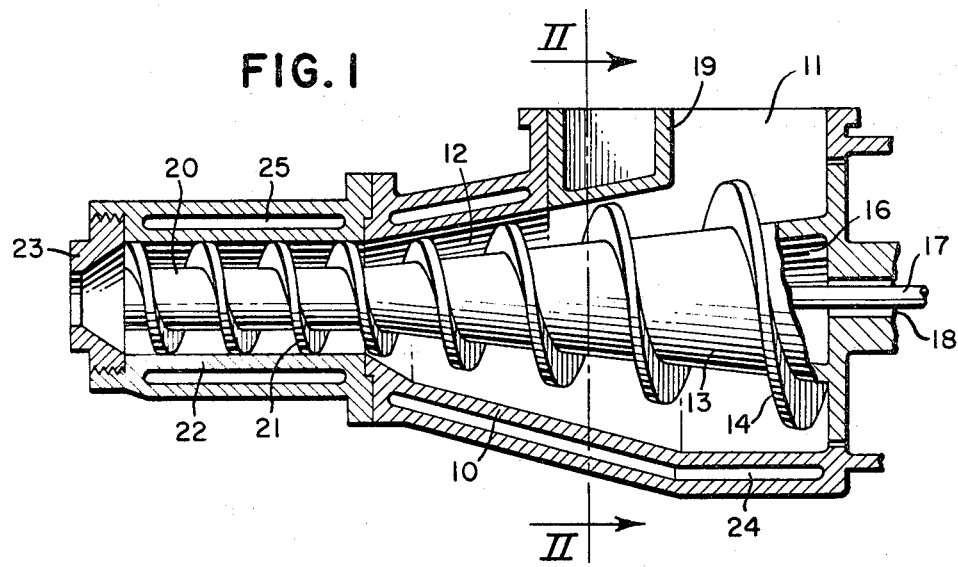
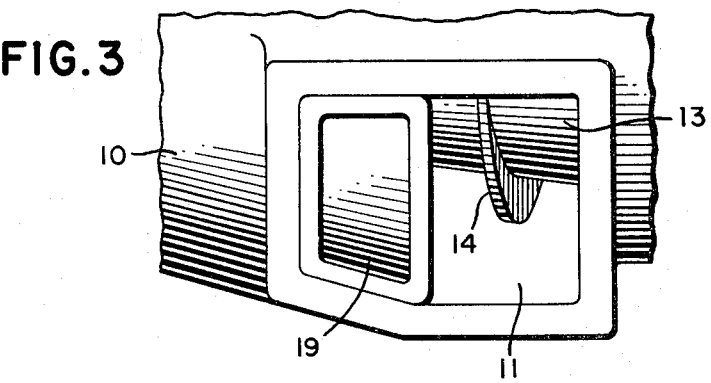
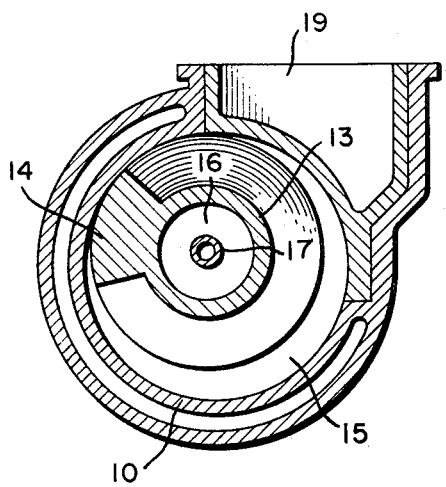
INVENTOR
Marcello Vanzo
BY *Stevens, Davis, Miller & Mosher*
ATTORNEYS June 4, 1968 M. VANZO 3,386,131
APPARATUS FOR THE CONTINUOUS TREATMENT OF RUBBER
AND PLASTIC MATERIAL IN GENERAL
Filed June 17, 1966 2 Sheets-Sheet 2

INVENTOR
Marcello Vanzo

BY *Stevens, Davis, Miller & Mosher*
ATTORNEYS

United States Patent Office 3,386,131
Patented June 4, 1968

3,386,131
APPARATUS FOR THE CONTINUOUS TREATMENT OF RUBBER AND PLASTIC MATERIAL IN GENERAL
Marcello Vanzo, Milan, Italy, assignor to Pirelli S.p.A., Milan, Italy
Filed June 17, 1966, Ser. No. 558,391
Claims priority, application Italy, Sept. 10, 1965, 20,161/65
10 Claims. (Cl. 18—12)

ABSTRACT OF THE DISCLOSURE

An apparatus for the treatment of plastic material including a receiver having a feed screw rotatably mounted therein and adapted to feed said material from an inlet opening to a discharge opening formed in the receiver. A closing member is quick detachably mounted in the inlet opening to cover a portion thereof in the general lengthwise direction of said receiver.

---

The present invention relates to an improved apparatus for the continuous treatment of plastic material in general and of rubber in particular.

Applicant, in his U.S. Patent No. 3,191,299, has provided an apparatus of the above type, which, in general, comprises a body provided with an inner cavity of frustoconical shape having an inlet opening located adjacent the end of greater diameter of said cavity, A frustoconical screw is assembled in the cavity with its greater diameter towards the inlet opening so as to leave between the envelope surface of the screw and the inner surface of the body a chamber, whose height in each section normal to the axis of the screw and radially measured with respect to the same, is variable from at least a minimum value to at least a maximum value.

In an apparatus of this kind, the frustoconical portion of the cavity is followed by a hollow cylindrical extruding portion within which rotates a cylindrical screw integral with the frustoconical screw. At the end of the cylindrical portion, opposite to the end which connects with the frustoconical portion, there is an opening for the discharge of the material after the treatment.

The material is mixed in the frustoconical portion of the apparatus by being advanced in a helical channel defined by the coils of the frustoconical screw. Since the volume of the material contained in this helical channel rapidly decreases from the feeding end to the discharge end, the amount of material in excess of the capacity of one portion of said channel and the capacity of the next portion cannot move towards the discharge outlet and must pay out into the above-mentioned chamber. The material passed into this chamber, being in contact with the screw and with the material rotating with it, is again drawn into rotation and is forced to find its way into said helical channel and continue its flow to the discharge end of the cavity. The cylindrical portion of the apparatus is provided for effecting an increase in the pressure on the material, until the pressure necessary for its extrusion is reached.

All other conditions being equal, the efficiency of the mixing is a function of the amount of material which is discharged from the frustoconical portion of the apparatus or, more specifically, of the number of times the material is subjected to the above-described mixing cycle.

As provided in the above-mentioned patent, if the cylindrical extension is not provided, the degree of mixing can be regulated by adjusting the position of an element disposed in the discharge end of the frustoconical cavity which is adapted to vary the opening of said end, and consequently the rate of the outcoming material.

If the apparatus does have the cylindrical extension of the frustoconical portion mentioned above, the degree of mixing cannot be regulated by varying the annular gap through which the material flows at a section in which the screw passes from the conical to the cylindrical shape, since it would be very difficult to achieve from a mechanical point of view and would further be unadvisable from a physical point of view, since the cylindrical portion would thus be underfed. Therefore, in order for this apparatus to treat different materials which require different mixing degrees, it is necessary to vary the length of the frustoconical screw. From the description of the working cycle, to which the material passing from the feeding end to the outlet end is repeatedly subjected, it appears that, although the mixing effect is noticeably strong, the laminating effect is not. Some materials, however, are not quite homogeneous in their mass since they may contain clots, etc. which cannot be destroyed by means of the mixing operation. It is, therefore, necessary to resort to a mechanical operation to eliminate these clots, namely an efficient lamination.

It is also recognized in the above-mentioned patent that such further treatment can be carried out by increasing the thickness of the thread of the frustoconical screw. However, from a construction standpoint, this solution is too expensive.

It is therefore an object of the present invention to solves the problems by providing an apparatus adaptable to treat a wider range of materials, and, more particularly, materials that have different physical characteristics, which therefore require different mixing degrees.

It is a further object of the present invention to provide an apparatus which, besides being able to treat materials requiring a different mixing degree, can carry out an efficient lamination of the same when necessary due to the particular characteristics of the material.

In general, the apparatus of the present invention is similar to that described above, but is provided with an extended inlet opening and with means to vary the size of this opening according to the length of the working portion of the apparatus that it is desired to subject the material to. The means to vary the inlet opening may be in the form of a removable closing element whose inner surface is shaped to constitute substantially a prolongation of the inner surface of the frustoconical body in a longitudinal direction with respect to said screw.

When the material to be treated requires a relatively high degree of mixing, the closing element is assembled on the apparatus so that the material will enter the cavity at the extreme end thereof and thereby pass through the whole length of the working portion of the frustoconical screw.

When the material to be treated requires a relatively low degree of mixing, the closing element is removed and the apparatus works as if the frustoconical screw was shorter, since the material can be supplied in a position nearer to the discharge end.

The latter case results in a reduced power consumption with consequently a minor heating of the product, which is a noticeable technical advantage.

Further, a disk may be provided on the cylindrical screw, preferably at an intermediate point along its length, the disk being of such a diameter and thickness that its peripheral surface and the corresponding portion of the inner surface of the cylindrical body together define a narrow annular gap through which the material is forced, thereby subjecting the material to an efficient lamination. The two faces of said disk may be flat or conical and profiled to facilitate the passage of the material through said narrow annular gap.

The features of the present invention will be more clearly understood from the following description, made with reference to the attached drawings, which show by way of non-limiting example an embodiment of the invention.

In the drawings:

FIG. 1 is a longitudinal central section of the apparatus according to the invention;

FIG. 2 is a cross section taken along line II—II of FIG. 1;

FIG. 3 is a partial top view of the apparatus of FIG. 1 showing the detail of the feeding opening extended towards the discharge end, and of the device for closing said extension;

Figure 4:
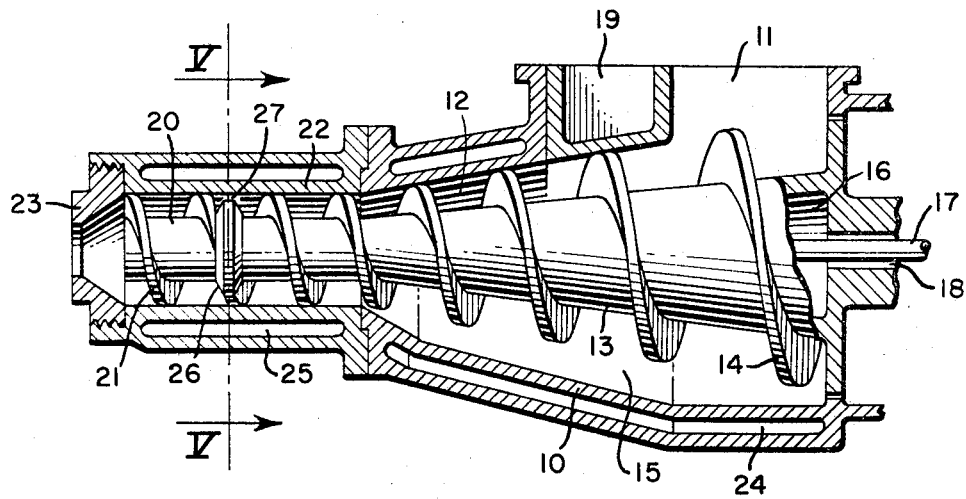
FIG. 4 is a longitudinal central section of the apparatus provided both with the prolonged feeding opening and its closing device, and with the laminating disk.

The apparatus represented in FIGS. 1–3 comprises a frustoconical body 10 into which the material to be treated is admitted through an opening or feeding hopper 11 located at the end of greater diameter and prolonged towards the outlet end.

The body 10 has a frustoconical cavity 12 within which is rotatably assembled a screw formed by a frustoconical hollow core 13 on which coils 14 are wound, said screw extending for the whole length of the body 10 and being eccentric with respect to cavity 12.

The pitch of the thread, its height in a direction normal to the axis of rotation of the screw, and the taper of the core are such that the volume of the helical channel defined by two adjacent coils progressively decreases from the end of the screw of greater diameter towards the end of smaller diameter.

The conicity of cavity 12 is greater than the conicity of the envelope surface of the frustoconical screw at least along a portion of the length of the body 10, and the axis of rotation of said screw forms with the axis of symmetry of the cavity 12 an angle of such a value that a generatrix of the envelope surface of the screw substantially meets a generatrix of the cavity 12. In a preferred embodiment, the respective longitudinal axis of said screw and said cavity form an angle which is equal to one half the angular difference between the two conicities. Thus, between the inner surface of the body 10 and the envelope surface of the screw, there is located a chamber 15 whose sections, in planes normal to the axis of rotation of the screw, are defined by two circumferences tangential at one point with each other. The diameter of said circumferences, and consequently the area of the chamber defined by them, progressively decrease from the feeding end towards the discharge end of said cavity.

A fluid may be admitted into cavity 16 of core 13 through tube 17 and out through annular opening 18 in order to heat or cool the screw till the temperature required to treat the material is reached.

As it may be seen from FIGS. 1 and 3, the length of feeding hopper 11 is adjustable in a longitudinal direction through use of a closing element 19 which may be inserted adjacent the inner wall of the feeding hopper as shown in FIG. 1. When the material to be treated requires a relatively large degree of mixing, the element 19 is assembled as shown in FIG. 1 in order to increase the length of the working portion of the apparatus. When the material requires a low mixing degree, the element 19 is removed and the material supplied to the feeding hopper at a position nearer the discharge end, thus reducing the working portion of the apparatus.

As it may be seen in FIG. 2, the element 19 has its inner surface profiled in such a way as to form a continuation of the inner surface of the body 10.

The frustoconical screw may extend downstream in the form of a cylindrical screw, the latter having a diameter equal to the smaller diameter of the frustoconical screw and including a cylindrical core 20 on which are wound coils 21. This cylindrical screw is disposed in a cylindrical body 22, which is connected with the frustoconical body 10.

The cylindrical body 22, at the end opposite to the end of connection with the frustoconical body 10, is provided with an interchangeable extruding die 23, from which the treated material is discharged in the form of a continuously extruded product.

In order to carry out the desired thermal conditioning, according to the type of material to be treated, the body 10 is provided with a jacket 24 and body 22 is provided with a jacket 25; fluid being circulated through said jackets at the desired temperature.

Figure 5:
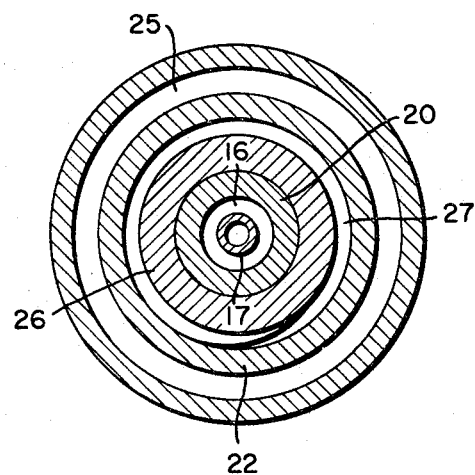
FIG. 5 is a cross section taken along line V—V of FIG. 4.

The apparatus represented in FIGS. 4 and 5 is quite similar to that previously described and, therefore, the same reference numerals have been maintained to indicate the same elements.

This second embodiment of the apparatus according to the invention includes, in the cylindrical portion, a solid disk 26, the peripheral surface of which, along with the inner surface of the cylindrical body 22, defines a narrow annular gap 27 through which all the material to be treated is passed being therefore subjected to a lamination.

Constructional modifications of the above can be made on the basis of the cited improvements, without departing from the scope of the present invention. For example, the closing element 19 can consist of several pieces, individually removable, in order to obtain many degrees of adjustment for the mixing operation. Moreover, more than one laminating disk 26 can be used, and said disks can be disposed in different positions along the cylindrical screw according to the technological properties of the materials to be treated. Further, as in the above cited patent, the section of the frustoconical screw may be elliptical or triangular with rounded vertices, and the chamber of a circular section, or the section of the chamber may be elliptical or triangular with rounded vertices, and the screw of a circular section. Also, the cylindrical extension of the screw may be multi-threaded in order to vary its performance, the basic working principle remaining unvaried.

Of course further variations of the specific construction and arrangement of this type mechanism herein disclosed can be made by those skilled in the art without departing from the invention as defined in the appended claims.

What is claimed is:

1. An apparatus for the treatment of plastic material comprising a receiver having a generally lengthwise extending inlet opening and a discharge opening, a feed screw rotatably mounted in said receiver and adapted to feed said material from said inlet opening to said discharge opening, and a closing member quick detachably mounted in said inlet opening to cover a portion thereof in the general lengthwise direction of said receiver, said closing member having an arcuate-shaped portion which forms an uninterrupted continuation of the inner surface of said receiver, the inner surface of said closing member being equally spaced from the addendum envelope of said screw throughout the length of said closing member.

2. The apparatus of claim 1, further comprising a solid disk mounted on said screw, said disk being of a diameter slightly less than the inner diameter of said receiver thus defining an annular gap between said disk and said receiver, thereby subjecting material passing through said gap to a lamination.

3. In an apparatus for the continuing treatment of plastic material comprising an extruding die, a cylindrical receiver communicating with said extruding die; a cylindrical feed screw rotatably mounted in said cylindrical receiver and adapted to feed said material from said cylindrical receiver to said extruding die; a second receiver having a generally lengthwise inlet opening, a discharge opening communicating with said cylindrical receiver, and a generally frusto-conical cavity communicating between said openings, the smaller end of said cavity communicating with the discharge opening and the larger end of said cavity communicating with the inlet opening; and a frusto-conical feed screw fixed with said cylindrical screw and rotatably mounted in said cavity with its greater diameter towards said inlet opening, said frusto-conical screw being adapted to feed said material from said inlet opening to said cylindrical receiver; the improvement comprising a closing member quick detachably mounted in said inlet opening to cover a portion thereof in the general lengthwise direction of said second receiver, said closing member having an arcuate-shaped portion which forms an uninterrupted continuation of the inner surface of said cavity, the inner surface of said closing member being equally spaced from the addendum envelope of said frusto-conical screw throughout the length of said closing member.

4. The improvement of claim 3, further comprising a solid disk mounted on said cylindrical screw, said disk being of a diameter slightly less than the inner diameter of said cylindrical receiver, thus defining an annular gap between said disk and said cylindrical receiver, thereby subjecting material passing through said gap to a lamination.

5. The improvement of claim 3, wherein said frusto-conical screw forms at least one helical channel, the cross section of which progressively decreases from said inlet opening to said discharge opening; and wherein said frusto-conical screw has an addendum envelope which, together with the inner surface of said second receiver, defines at least one generally annular chamber substantially coextensive with said cavity, said chamber being of a height, measured radially with respect to said frusto-conical feed screw, varying progressively from a minimum to a maximum and returning to a minimum.

6. The improvement defined by claim 1 wherein the conicity of said frustoconical feed screw is smaller than the corresponding conicity of the cavity throughout at least a portion of the length of said second receiver, the respective longitudinal axes of the frustoconical screw and of the cavity thereby forming an angle which is equal to one-half the angular difference between the two conicities.

7. The improvement defined by claim 1 wherein said chamber and said helical channel are in completely open communication throughout their respective lengths.

8. The improvement defined by claim 1 wherein the height of said chamber is minimum at a point on the inner surface of said receiver approximately 180° from the point where the height of said chamber is maximum.

9. The improvement defined by claim 1 wherein the positions of minimum height of the chamber limited by the addendum envelope of the frustoconical screw and by the inner surface of said frustoconical cavity are aligned according to a generatrix of said cavity.

10. The improvement defined by claim 1 further comprising a solid disk mounted on said cylindrical screw, said disk being of a diameter slightly less than the inner diameter of said cylindrical receiver, thus defining an annular gap between said disk and said receiver, thereby subjecting material passing through said gap to a lamination.

References Cited

UNITED STATES PATENTS

| 1,066,722 | 7/1913 | Ganzhorn | 146—182.3 |
| 2,262,989 | 11/1941 | Conklin et al. | |
| 2,422,722 | 6/1947 | Fielitz | 18—12 |
| 2,807,832 | 10/1957 | Davis | 18—12 |
| 2,838,794 | 6/1958 | Munger et al. | 18—12 |
| 3,191,229 | 6/1965 | Vanzo | 18—12 |

FOREIGN PATENTS

| 942,260 | 11/1963 | Great Britain. |

WILLIAM J. STEPHENSON, *Primary Examiner.*

UNITED STATES PATENT OFFICE
CERTIFICATE OF CORRECTION

Patent No. 3,386,131                        June 4, 1968

Marcello Vanzo

It is certified that error appears in the above identified patent and that said Letters Patent are hereby corrected as shown below:

Column 2, line 30, "solves the" should read -- solve these --. Column 6, lines, 1, 8, 10, 15 and 20, claim reference numeral "1", each occurrence, should read -- 5 --.

Signed and sealed this 9th day of December 1969.

(SEAL)
Attest:

Edward M. Fletcher, Jr.                      WILLIAM E. SCHUYLER, JR.
Attesting Officer                            Commissioner of Patents